(12) United States Patent
Bednarek

(10) Patent No.: US 10,173,684 B2
(45) Date of Patent: Jan. 8, 2019

(54) VEHICLE AUTOMATIC ENGAGED STOP SYSTEM

(71) Applicant: GM Global Technology Operations LLC, Detroit, MI (US)

(72) Inventor: Georg Bednarek, Darmstadt (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 357 days.

(21) Appl. No.: 15/146,439

(22) Filed: May 4, 2016

(65) Prior Publication Data

US 2017/0320499 A1 Nov. 9, 2017

(51) Int. Cl.
| | |
|---|---|
| *B60W 30/18* | (2012.01) |
| *B60T 1/00* | (2006.01) |
| *B60W 10/10* | (2012.01) |
| *B60W 10/184* | (2012.01) |
| *B60W 50/14* | (2012.01) |
| *B60T 1/06* | (2006.01) |
| *B60T 7/04* | (2006.01) |
| *B60T 7/12* | (2006.01) |

(52) U.S. Cl.
CPC ....... *B60W 30/18118* (2013.01); *B60T 1/005* (2013.01); *B60T 1/062* (2013.01); *B60T 7/042* (2013.01); *B60T 7/122* (2013.01); *B60W 10/10* (2013.01); *B60W 10/184* (2013.01); *B60W 50/14* (2013.01); *B60T 2201/06* (2013.01); *B60W 2050/146* (2013.01); *B60W 2510/1005* (2013.01); *B60W 2520/04* (2013.01); *B60W 2520/16* (2013.01); *B60W 2540/10* (2013.01); *B60W 2540/12* (2013.01); *B60W 2710/1005* (2013.01)

(58) Field of Classification Search
CPC ................................................ B60W 30/18118
See application file for complete search history.

(56) References Cited

U.S. PATENT DOCUMENTS 8,090,499 B2 * 1/2012 Tamai .................. B60W 10/06
477/3

\* cited by examiner

*Primary Examiner* — Derek D Knight

(57) ABSTRACT

A motor vehicle automatic engaged stop system includes an automatic transmission driving at least one wheel and has at least one brake member preventing wheel rotation when engaged and allowing wheel rotation when disengaged. A controller communicates with each of: the brake member to control the brake member; the automatic transmission to control a condition of the automatic transmission, and with a signal device. A brake pedal in communication with the brake member engages the brake member when depressed by a vehicle operator. After the motor vehicle reaches a zero speed the controller energizes the signal device to notify the vehicle operator to release the brake pedal and maintains a vehicle stopped condition with the brake pedal in a released condition and when the motor vehicle is positioned anywhere between uphill and downhill orientation planes.

19 Claims, 3 Drawing Sheets

VEHICLE AUTOMATIC ENGAGED STOP SYSTEM

FIELD

The present disclosure relates to vehicle drive systems, and more particularly to a vehicle automatically engaged stop system operable during level, uphill and downhill operating conditions.

BACKGROUND

The statements in this section merely provide background information related to the present disclosure and may or may not constitute prior art.

Known motor vehicle "hill hold" technology provides for a vehicle stop hold when the vehicle reaches a speed of zero mph and when the vehicle is oriented in an uphill condition. This allows the driver to remove pressure from the brake pedal without the vehicle subsequently rolling backwards. These systems normally lock the transmission by applying an internal frictional engagement member and have a time dependent operating state as they are not intended for continuous or long term operation of the vehicle. Such systems are not functional when the vehicle is positioned at a level or flat state, or in a down-hill orientation, such as may be encountered when the vehicle is in a traffic jam for extended periods of time or waiting at lengthy red lights. During this time, as long as the transmission remains in the drive position the driver must either maintain pressure on the brake pedal, apply a hand brake, or manually reposition the transmission selector to a "Park" position to prevent vehicle forward creep. The vehicle will creep forward at slow speed if none of the above actions are taken. Continuous application of brake pressure for extended periods of time may lead to driver fatigue. The alternative may require frequent shifting into and out of park or frequent engagement and release of the parking brake if traffic moves at erratic intervals.

Accordingly, there is room in the art for an automatically engaged vehicle stop system that allows the driver to remove his or her foot from the brake pedal when the vehicle is stopped with the engine running, on substantially flat ground or in an uphill or a down-hill orientation without application of a hand brake or repositioning the transmission to the park position.

SUMMARY

The present disclosure provides an example of a vehicle automatic engaged stop system having an automatic transmission driving at least one wheel. At least one brake member acts when engaged by actuation of a brake pedal to prevent rotation of the at least one wheel and when disengaged allowing rotation of the at least one wheel. A controller is provided for controlling operation of the at least one brake member and for controlling a condition of the automatic transmission. The controller maintains a vehicle stopped condition with the brake pedal in a released condition after the motor vehicle reaches a zero speed and when the motor vehicle is positioned anywhere between an uphill defining orientation plane and a downhill defining orientation plane.

In one example of the vehicle automatic engaged stop system of the present disclosure, the controller automatically engages the at least one brake member to maintain the vehicle stopped condition after the motor vehicle reaches the zero speed with the automatic transmission in a drive position.

In another example of the vehicle automatic engaged stop system of the present disclosure, a release system is provided for disengaging the at least one brake member from the at least one wheel.

In yet another example of the vehicle automatic engaged stop system of the present disclosure, an engine accelerator pedal is provided, wherein the release system includes a release action defined by the vehicle operator contacting and displacing the engine accelerator pedal, the displacement causing release of the at least one brake member.

In yet another example of the vehicle automatic engaged stop system of the present disclosure, the release system includes a release action defined by the vehicle operator actuating the switch causing release of the at least one brake member.

In yet another example of the vehicle automatic engaged stop system of the present disclosure, the controller communicates with an Electronic Transmission Range Selection (ETRS) system providing for electronic transmission control; and the controller automatically directs repositioning of the automatic transmission to a park position after the motor vehicle reaches the zero speed with the brake pedal in a released condition.

In yet another example of the vehicle automatic engaged stop system of the present disclosure, the controller is connected to a throttle control system of an engine of the motor vehicle.

In yet another example of the vehicle automatic engaged stop system of the present disclosure the controller includes or enables a plurality of logic routines for monitoring, manipulating, and generating data and control signals for operation of the at least one brake member or a transmission operating position.

In yet another example of the vehicle automatic engaged stop system of the present disclosure further includes a system actuation notification device energized to notify the vehicle operator when the vehicle automatic engaged stop system is in an operating condition, and therefore when it is allowable to release pressure on the brake pedal.

In yet another example of the vehicle automatic engaged stop system of the present disclosure, the system actuation notification device defines a lighted indicator.

In yet another example of the vehicle automatic engaged stop system of the present disclosure, the controller is operable to automatically engage the at least one brake member at any vehicle angular orientation between a first plane defining a positive angle with respect to a horizontal second plane defining zero degrees.

In yet another example of the vehicle automatic engaged stop system of the present disclosure, the controller is operable to automatically engage the at least one brake member at any negative angle beta ($\beta$) defining a down-hill orientation measured between the horizontal plane and a third plane.

In yet another example the vehicle automatic engaged stop system of the present disclosure further includes a brake system to actuate the at least one brake member when the brake pedal is depressed by a vehicle operator; and a brake pedal sensor in communication with the controller to identify a position of the brake pedal.

In yet another example the vehicle automatic engaged stop system of the present disclosure further includes an accelerator pedal in communication with an engine; and an accelerator pedal position sensor in communication with the controller.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
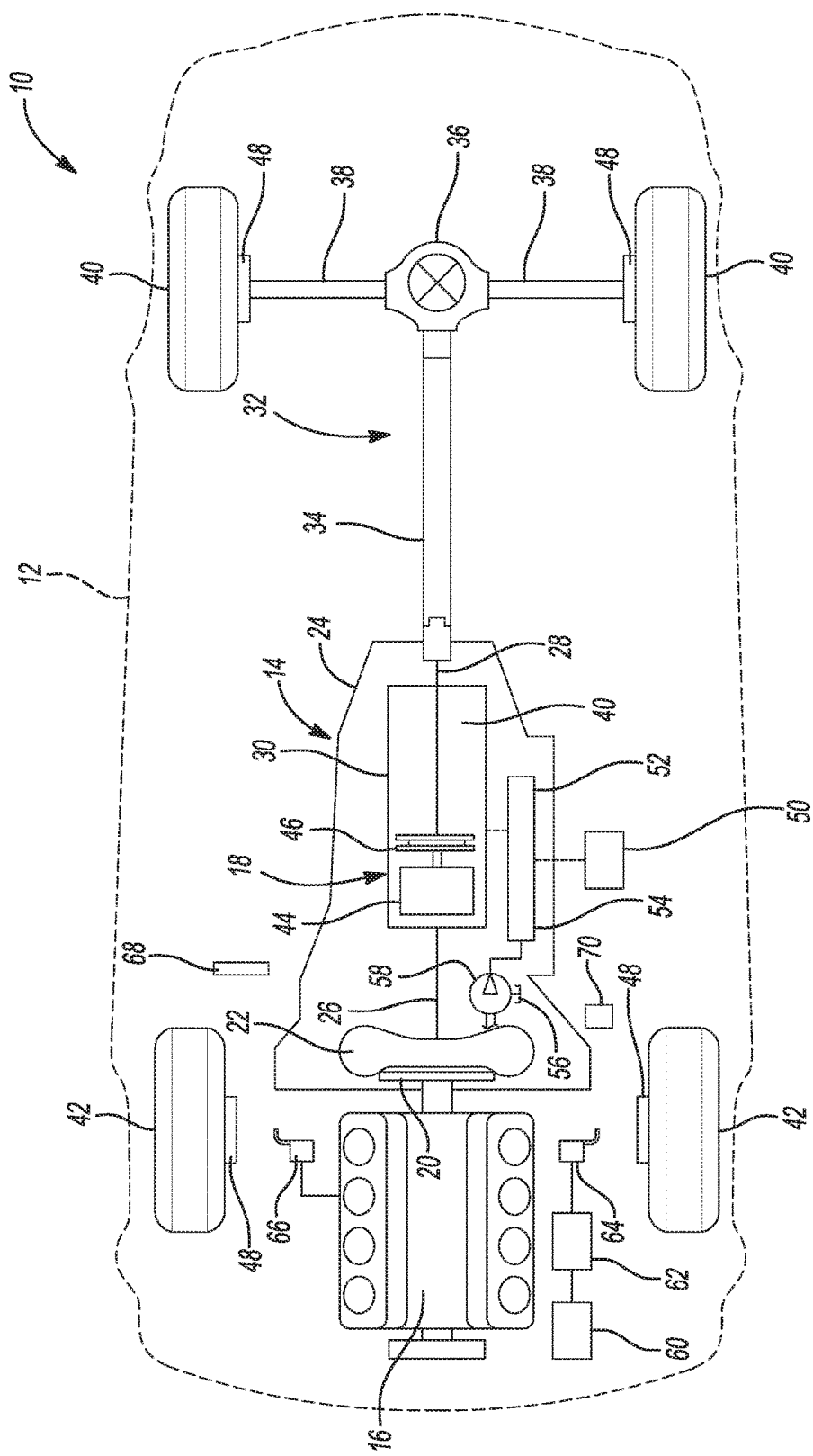
FIG. 1 is a diagrammatic presentation of a vehicle automatic engaged stop system according to the principles of the present disclosure.

With reference to FIG. 1, a vehicle automatic engaged stop system 10 is provided for a motor vehicle 12. The motor vehicle 12 is illustrated as a passenger car, but it should be appreciated that the motor vehicle 12 may be any type of vehicle, such as a truck, van, sport-utility vehicle, etc. The motor vehicle 12 includes an exemplary powertrain 14. It should be appreciated at the outset that while a rear-wheel drive powertrain 14 has been illustrated, the motor vehicle 12 may have a front-wheel drive powertrain, a mid-engine powertrain, or an all-wheel drive powertrain without departing from the scope of the present disclosure. The powertrain 14 generally includes an engine 16 interconnected with an automatic transmission 18.

The engine 16 may be a conventional internal combustion engine, an electric motor, a hybrid engine, or any other type of prime mover, without departing from the scope of the present disclosure. The engine 16 supplies a driving torque to the transmission 18 through a flexplate 20 or other connecting device that is connected to a starting device 22. The starting device 22 may be a hydrodynamic device such as a fluid coupling or torque converter, a wet dual clutch, a dry dual clutch, a dry torque damper with springs, or an electric motor. It should be appreciated that any starting device 22 between the engine 16 and the transmission 18 may be employed including a dry launch clutch.

The transmission 18 has a typically cast, metal housing 24 which encloses and protects the various components of the transmission 18. The housing 24 includes a variety of apertures, passageways, shoulders and flanges which position and support these components. Generally speaking, the transmission 18 includes a transmission input shaft 26 and a transmission output shaft 28. Disposed between the transmission input shaft 26 and the transmission output shaft 28 is typically a gear and clutch arrangement 30. The transmission input shaft 26 is functionally interconnected with the engine 16 via the starting device 22 and receives input torque from the engine 16. Accordingly, the transmission input shaft 26 may be a turbine shaft in the case where the starting device 22 is a hydrodynamic device, dual input shafts where the starting device 22 is dual clutch, or a drive shaft where the starting device 22 is an electric motor.

The transmission input shaft 26 is coupled to and provides drive torque to the gear and clutch arrangement 30. For the exemplary rear-wheel drive vehicle shown, the transmission output shaft 28 is connected with a final drive unit 32 which includes, for example, a prop-shaft 34, a differential assembly 36, and drive axles 38 connected to driven wheels 40. Non-driven wheels 42 can also be provided. The gear and clutch arrangement 30 can further include a planetary gear set 44 interconnected by frictional engagement members 46 for application of drive torque to the transmission output shaft 28. Individual brake members 48, which can be provided for example as disc brakes are provided at each of the driven wheels 40 and the non-driven wheels 42.

The motor vehicle 12 can further include a system control module defining a transmission control module 50. The transmission control module 50 is preferably a non-generalized, electronic control device having a preprogrammed digital computer or processor, control logic or circuits, memory used to store data, and at least one I/O peripheral. The control logic includes or enables a plurality of logic routines for monitoring, manipulating, and generating data and control signals. The automatic transmission 18 or the transmission control module 50 can be provided with an Electronic Transmission Range Selection (ETRS) system providing for electronic transmission control. According to several aspects, a hydraulic control system 52 connected to and controlled by the transmission control module 50 is disposed within a valve body 54 that contains and houses, via fluid paths and valve bores, most of the components of the hydraulic control system 52. These components include, but are not limited to, pressure regulation valves, directional valves, solenoids, etc. The hydraulic control system 52 is operable to selectively engage the frictional engagement members 46 such as clutches or hydraulic brakes and to provide cooling and lubrication to the transmission 18 by selectively communicating a hydraulic fluid from a sump 56 under pressure from either a pump 58 such as a fixed displacement pump, or an accumulator (not shown), or an auxiliary electric pump (not shown). The pump 58 may be driven by the engine 16 or by an auxiliary engine or electric motor.

The motor vehicle 12 can include a system control module or controller 60. The controller 60 is preferably a non-generalized, electronic control device having a preprogrammed digital computer or processor, control logic or circuits, memory used to store data, and at least one I/O peripheral. The control logic includes or enables a plurality of logic routines for monitoring, manipulating, and generating data and control signals for controlling operation of the brake members 48. A hydraulic brake system 62 can be connected to the controller 60 which applies hydraulic braking pressure to stop rotation of any one or each of the driven wheels 40 and the non-driven wheels 42. Braking pressure is provided during normal vehicle operation by manual application of pressure to a brake pedal 64 by the operator of the motor vehicle 12. The brake pedal 64 is connected to the brake system 62 which can further include a boost assist or connection to a vacuum system as is known. An accelerator pedal 66 connected to a throttle control system of the engine 16 controls operation of the engine 16 and is provided to accelerate or decelerate the motor vehicle 12 between a zero speed and a range of operating speeds.

Referring to FIG. 2 and again to FIG. 1, the vehicle automatic engaged stop system 10 is initiated or engaged when the motor vehicle 12 is stopped with the engine 16 running, and when oriented at an upward angle less than an angle defined by a first plane "A". Because the engine 16 can be an electric motor, the engine running condition also includes an electric motor in an operating or energized drive condition. The first plane "A" is oriented at any positive angle less than an angle alpha (α) defined with respect to a flat or horizontal second plane "B". If the motor vehicle 12 is oriented at or greater than the angle alpha defined by a position above the first plane "A", and shown as a third plane "C" a known Hill-hold operation may be available, which prevents the motor vehicle from back-rolling while facing uphill with respect to the first plane "A".

The vehicle automatic engaged stop system 10 is operable when the motor vehicle 12 is stopped with the engine 16 running and is oriented at any angle less than angle alpha, including when the motor vehicle 12 is oriented substantially horizontal and therefore parallel with respect to the second plane "B", or when the motor vehicle 12' is positioned in a down-hill orientation. According to several aspects, the vehicle automatic engaged stop system 10 is operable to automatically engage the brake members 48 when the motor vehicle 12, 12' reaches zero mph, at any vehicle angular orientation less than angle alpha down to an angle of zero degrees (parallel with the second plane "B"), and additionally at any negative angle beta (β) defining a down-hill orientation measured between the second or horizontal plane "B" and a fourth plane "D" which defines a maximum downhill angle the vehicle automatic engaged stop system 10 is designed to operate at. The vehicle automatic engaged stop system 10 is also operable to engage the brake members 48 when the motor vehicle 12, 12' reaches a speed of zero mph, is engaged in any forward "Drive" position, and when positioned at any operable vehicle orientation between the plane "A" located with respect to angle alpha and zero degrees, and additionally at any angle beta (β) defined by the fourth plane "D" creating a vehicle down-hill orientation with respect to the second plane "B". The "Drive" position can be for example a transmission drive, low, low 1, low 2, sport, 4×4, or other forward drive position selected by the vehicle operator.

Figure 2:
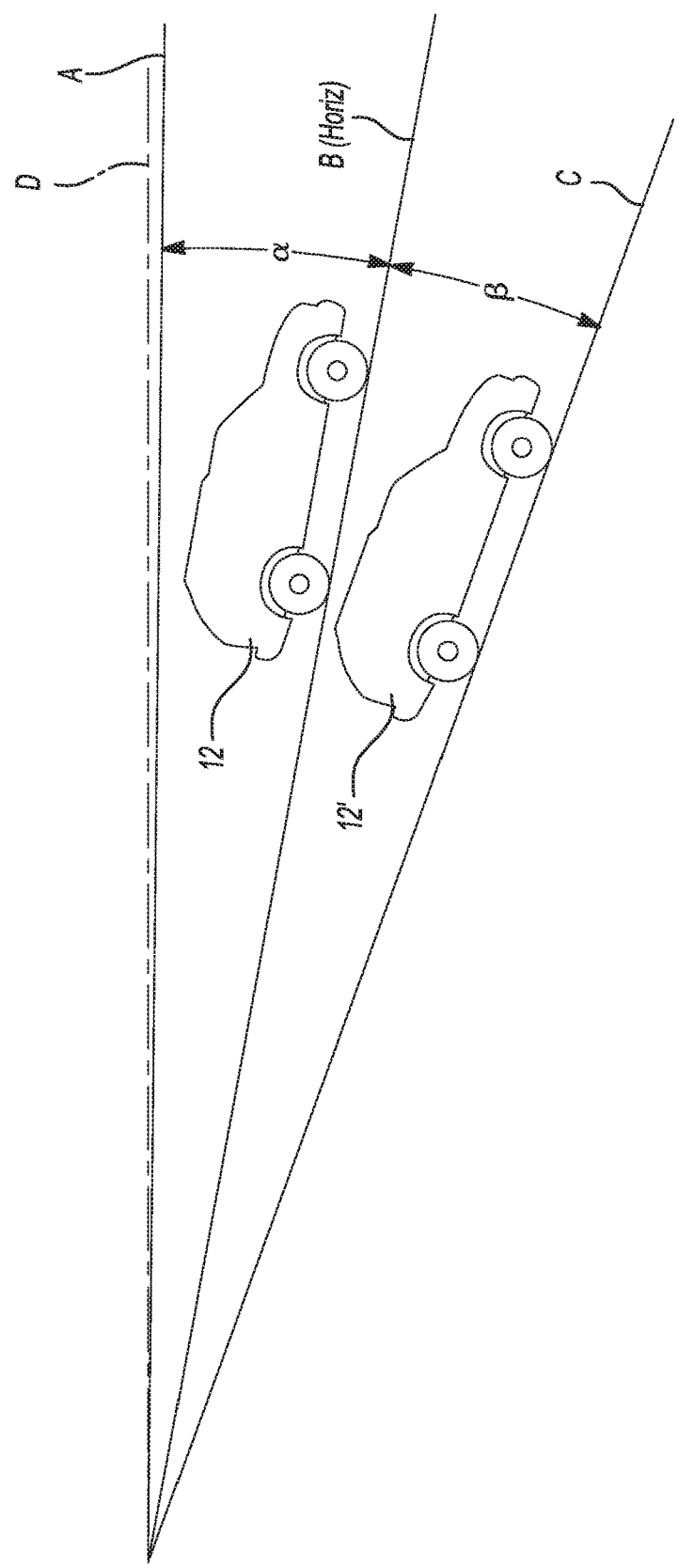
FIG. 2 is a diagrammatic presentation of various vehicle grade thresholds for operation of the vehicle automatic engaged stop system.

With continued reference to FIGS. 1 and 2, operation of the vehicle automatic engaged stop system 10 allows the vehicle operator to release pressure on the brake pedal 64 for any length of time while the motor vehicle 12 is running, when in any forward drive position, and when in the angular range defined by any operable vehicle orientation noted above. The vehicle automatic engaged stop system 10 will automatically initiate and operate when the motor vehicle 12 reaches a speed of zero mph and with the transmission 14 in any forward "Drive" position allowing the vehicle operator to subsequently release contact with the brake pedal 64. According to several aspects, a system actuation notification device 68 is energized, such as a lighted indicator, which may also be accompanied by an audible indicator, to notify the vehicle operator when the vehicle automatic engaged stop system 10 is in the operating condition, and therefore when it is acceptable for the vehicle operator to release pressure on the brake pedal 64.

According to several aspects, when the motor vehicle 12 is equipped with the Electronic Transmission Range Selection (ETRS) system providing for electronic transmission control, the controller 60 will automatically initiate the vehicle automatic engaged stop system 10 when the motor vehicle 12 reaches a speed of zero mph by changing a condition of the automatic transmission 18 from a drive condition to a Park condition, and energize the actuation notification device 68, thereby allowing the vehicle operator to subsequently release contact with the brake pedal 64. According to several aspects, the system actuation notification device 68, such as the lighted indicator, and which may also be accompanied by an audible indicator, will notify the vehicle operator when the vehicle automatic engaged stop system 10 is in the operating condition, and therefore when it is acceptable for the vehicle operator to release pressure on the brake pedal 64.

A release system is provided to release the vehicle automatic engaged stop system 10 from the operating condition. The release system provides the vehicle operator with a choice of at least two different release actions. In a first release action, the vehicle operator contacts and displaces the accelerator pedal 66, the displacement being sensed by the vehicle automatic engaged stop system 10 and causing release of the brake members 48, or reengagement of the transmission "Drive" selection if the ETRS system is in use. In a second release action, the vehicle operator can manually actuate a switch 70 which can be positioned for example on a vehicle dash board or on a steering wheel face. Actuation of the switch 70 causes release of the brake members 48 or reengagement of the transmission "Drive" selection, independently of contacting the accelerator pedal 66. Once the vehicle automatic engaged stop system 10 is disengaged, the motor vehicle 12 will return to normal drive operation, requiring braking action by the vehicle operator as necessary to prevent forward rolling motion of the motor vehicle 12.

Figure 3:
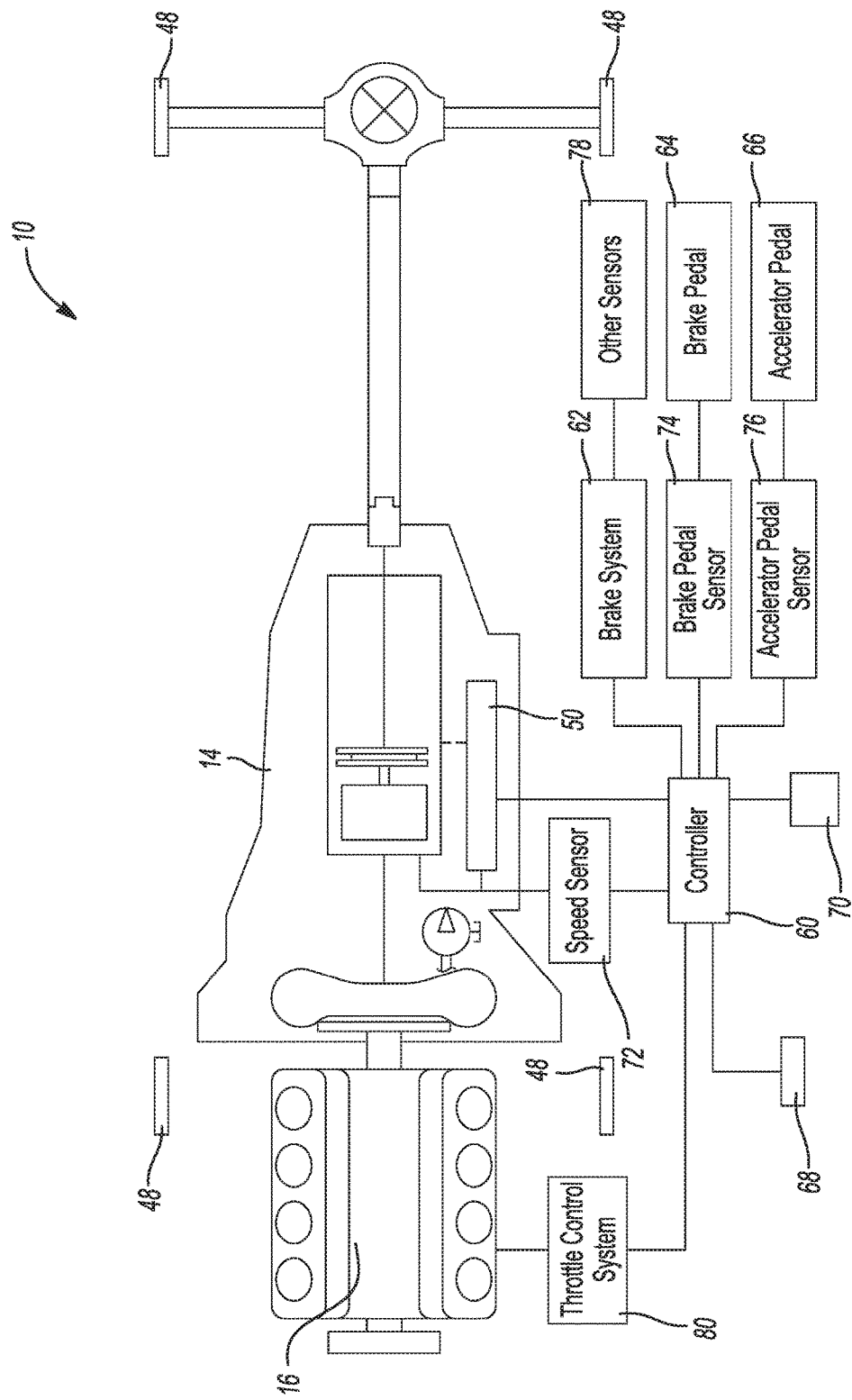
FIG. 3 is a flowchart illustrating components and steps for controlling an automatic vehicle stop using the vehicle automatic engaged stop system of the present disclosure.

Referring to FIG. 3 and again to FIGS. 1 through 2, the vehicle automatic engaged stop system 10 can further include a vehicle speed sensor 72 connected to the controller 60, which identifies a speed of the motor vehicle 12 for use in determining when the vehicle speed is zero mph. The vehicle speed sensor can be connected to a component of the transmission 18, or to another vehicle component or system. The brake pedal 64 is connected to a brake pedal sensor 74 which is in communication with the controller 60 to identify the position of the brake pedal 64. The accelerator pedal 66 is connected to an accelerator pedal sensor 76 which is in communication with the controller 60 to identify the position of the accelerator pedal 64. Each of the actuation notification device 68 and the switch 70 can also be connected to the controller 60. Additional sensors, connected to the brake system 78 or directly connected to the controller 60 and generally identified at 78, can include vehicle inclination sensors, engine operational sensors, temperature sensors, and the like. The controller 60 can further be in communication with a throttle control system 80 which controls operation of the engine 16 together with the accelerator pedal 66.

It should also be appreciated that the automatic engaged stop system 10 of the present disclosure may have other configurations, such as having fewer or greater than four wheels, and fewer or greater than four brake members. Modifications to the range of uphill or downhill system operating angles can also be made without departing from the scope of the present disclosure.

According to several aspects of the present disclosure, a motor vehicle automatic engaged stop system 10 includes an automatic transmission 18 driving at least one wheel 40, 42 and having at least one brake member 48 acting when engaged to prevent rotation of the at least one wheel 40, 42 and when disengaged allowing rotation of the at least one wheel 40, 42. A controller 60 is: in communication with the at least one brake member 48 for controlling operation of the at least one brake member 48; in communication with the automatic transmission 18 for controlling a condition of the automatic transmission 18; and in communication with a signal device 68. A brake pedal 64 in communication with the at least one brake member 48 acts to engage the at least one brake member 48 when depressed by a vehicle operator. After the motor vehicle 12 reaches a zero speed the controller 60: energizes the signal device 68 to notify the vehicle operator to release the brake pedal 64; and maintains a vehicle stopped condition with the brake pedal 64 in a released condition and when the motor vehicle 12 is positioned anywhere between an uphill defining orientation plane "A" and a downhill defining orientation plane "D".

The description of the invention is merely exemplary in nature and variations that do not depart from the general gist of the invention are intended to be within the scope of the invention. Such variations are not to be regarded as a departure from the spirit and scope of the invention.

What is claimed is:

1. A motor vehicle automatic engaged stop system for a motor vehicle, comprising:
   an automatic transmission driving at least one wheel;
   at least one brake member acting when engaged by actuation of a brake pedal to prevent rotation of the at least one wheel and when disengaged allowing rotation of the at least one wheel;
   a controller for controlling operation of the at least one brake member and for controlling a condition of the automatic transmission; and
   a system actuation notification device energized to notify the vehicle operator when the vehicle automatic engaged stop system is in an operating condition, and therefore when it is allowable to release pressure on the brake pedal;
   wherein the controller maintains a vehicle stopped condition with the brake pedal in a released condition after the motor vehicle reaches a zero speed and when the motor vehicle is positioned anywhere between an uphill defining orientation plane and a downhill defining orientation plane.

2. The motor vehicle automatic engaged stop system of claim 1, wherein the controller automatically engages the at least one brake member to maintain the vehicle stopped condition after the motor vehicle reaches the zero speed with the automatic transmission in a drive position.

3. The motor vehicle automatic engaged stop system of claim 2, further including a release system for disengaging the at least one brake member from the at least one wheel.

4. The motor vehicle automatic engaged stop system of claim 3, further including an engine accelerator pedal, wherein the release system includes a release action defined by the vehicle operator contacting and displacing the engine accelerator pedal, the displacement generating a signal to the controller to release the at least one brake member.

5. The motor vehicle automatic engaged stop system of claim 3, further including a switch, wherein the release system includes a release action defined by the vehicle operator actuating the switch generating a signal to the controller to release the at least one brake member.

6. The motor vehicle automatic engaged stop system of claim 2, wherein the controller is operable to automatically engage the at least one brake member at any vehicle angular orientation between a first plane defining a positive angle with respect to a horizontal second plane defining zero degrees.

7. The motor vehicle automatic engaged stop system of claim 6, wherein the controller is operable to automatically engage the at least one brake member at any negative angle beta (β) defining a down-hill orientation measured between the horizontal plane and a third plane.

8. The motor vehicle automatic engaged stop system of claim 1, wherein:
   the controller communicates with an Electronic Transmission Range Selection (ETRS) system providing for electronic transmission control; and
   the controller automatically directs repositioning of the automatic transmission to a park position after the motor vehicle reaches the zero speed with the brake pedal in a released condition.

9. The motor vehicle automatic engaged stop system of claim 1, wherein the controller is connected to a throttle control system of an engine of the motor vehicle.

10. The motor vehicle automatic engaged stop system of claim 1, wherein the controller includes or enables a plurality of logic routines for monitoring, manipulating, and generating data and control signals for operation of the at least one brake member or a transmission operating position.

11. The motor vehicle automatic engaged stop system of claim 1, wherein the system actuation notification device defines a lighted indicator.

12. The motor vehicle automatic engaged stop system of claim 1, further including:
   a brake system to actuate the at least one brake member when the brake pedal is depressed by a vehicle operator; and
   a brake pedal sensor in communication with the controller to identify a position of the brake pedal.

13. The motor vehicle automatic engaged stop system of claim 1, further including:
   an accelerator pedal in communication with an engine; and
   an accelerator pedal position sensor in communication with the controller.

14. A motor vehicle automatic engaged stop system for a motor vehicle, comprising:
   an automatic transmission driving at least one wheel and having at least one brake member acting when engaged to prevent rotation of the at least one wheel and when disengaged allowing rotation of the at least one wheel;
   a controller in communication with the at least one brake member for controlling operation of the at least one brake member, in communication with the automatic transmission for controlling a condition of the automatic transmission, and in communication with a signal device; and
   a brake pedal in communication with the at least one brake member acting to engage the at least one brake member when depressed by a vehicle operator;
   wherein after the motor vehicle reaches a zero speed the controller:
     energizes the signal device to notify the vehicle operator to release the brake pedal; and
     maintains a vehicle stopped condition with the brake pedal in a released condition and when the motor vehicle is positioned anywhere between an uphill defining orientation plane and a downhill defining orientation plane.

15. The motor vehicle automatic engaged stop system of claim 14, wherein the controller actuates the at least one brake member when the motor vehicle reaches the zero speed, with the automatic transmission in a drive position.

16. The motor vehicle automatic engaged stop system of claim 14, wherein the controller automatically directs repositioning of the automatic transmission to a park position after the motor vehicle reaches the zero speed.

17. The motor vehicle automatic engaged stop system of claim 14, further including an accelerator pedal connected to an accelerator pedal sensor which is in communication with the controller to identify a position of the accelerator pedal.

18. The motor vehicle automatic engaged stop system of claim 14, wherein the brake pedal is connected to a brake pedal sensor which is in communication with the controller to identify a position of the brake pedal.

19. A method for automatically stopping a motor vehicle, the motor vehicle including an automatic transmission driving at least one wheel and having at least one brake member acting when engaged to prevent rotation of the at least one wheel and when disengaged allowing rotation of the at least one wheel, the method comprising:

placing a brake pedal in communication with the at least one brake member, the brake pedal engaging the at least one brake member when depressed by a vehicle operator;

providing communication to the at least one brake member from a controller;

signaling the at least one brake member from the controller to engage the at least one brake member when the motor vehicle is stopped, with the automatic transmission in a drive position, and when the motor vehicle is positioned anywhere between an uphill defining orientation plane and a downhill defining orientation plane; and notifying a vehicle operator to release the brake pedal.

\* \* \* \* \*